(12) United States Patent
Pavlov et al.

(10) Patent No.: US 10,596,802 B2
(45) Date of Patent: Mar. 24, 2020

(54) CALIBRATION SYSTEMS FOR CALIBRATING BUILD PLATFORMS OF ADDITIVE MANUFACTURING SYSTEMS AND RELATED PROGRAM PRODUCTS

(71) Applicant: General Electric Company, Schenectady, NY (US)

(72) Inventors: Mikhail Pavlov, Dietikon (CH); Donnell Eugene Crear, Simpsonville, SC (US); Felix Martin Gerhard Roerig, Baden (CH); Dean Andrew Snelling, Jr., Greenville, SC (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 15/608,154

(22) Filed: May 30, 2017

(65) Prior Publication Data

US 2018/0348492 A1 Dec. 6, 2018

(51) Int. Cl.
| | | |
|---|---|---|
| *B29C 67/00* | (2017.01) | |
| *B33Y 40/00* | (2020.01) | |
| *B33Y 50/02* | (2015.01) | |
| *B33Y 30/00* | (2015.01) | |
| *B29C 64/153* | (2017.01) | |
| *B29C 64/393* | (2017.01) | |
| *B29C 64/268* | (2017.01) | |

(52) U.S. Cl.
CPC ............ *B33Y 40/00* (2014.12); *B29C 64/153* (2017.08); *B29C 64/393* (2017.08); *B33Y 30/00* (2014.12); *B33Y 50/02* (2014.12); *B29C 64/268* (2017.08)

(58) Field of Classification Search
CPC ......... B33Y 40/00; B33Y 50/02; B33Y 30/00; B29C 64/393; B29C 64/153; B29C 64/268; G01B 11/27
See application file for complete search history.

(56) References Cited

U.S. PATENT DOCUMENTS

| | | |
|---|---|---|
| 6,501,061 B1 | 12/2002 | Kitai et al. |
| 7,847,212 B2 | 12/2010 | Renz et al. |

(Continued)

FOREIGN PATENT DOCUMENTS

| | | |
|---|---|---|
| WO | 2015191257 A1 | 12/2015 |
| WO | 2016085334 A2 | 6/2016 |

*Primary Examiner* — Galen H Hauth
(74) *Attorney, Agent, or Firm* — Dale Davis; Hoffman Warnick LLC

(57) ABSTRACT

Additive manufacturing systems (AMS) are disclosed. The AMS may include a movable build platform, and a calibration system operably connected to the build platform. The calibration system may include a reflective element operably coupled to the build platform, a first calibration model positioned above and vertically offset from the reflective element, and a first camera substantially aligned with the first calibration model. The first camera may be visually aligned with the reflective element to capture a first reflective image of the first calibration model as reflected by the reflective element. The calibration system may also include at least one computing device operably connected to the build platform and the first camera, and configured to calibrate the build platform by: adjusting an actual inclination of the build platform in response to determining the first reflective image differs from a predetermined image of the first calibration model.

20 Claims, 13 Drawing Sheets

(56) References Cited

U.S. PATENT DOCUMENTS

| | | | |
|---|---|---|---|
| 8,105,527 B2 | 1/2012 | Wahlstrom | |
| 9,233,507 B2 | 1/2016 | Bibas | |
| 2015/0100149 A1* | 4/2015 | Coeck | G01S 5/16 |
| | | | 700/120 |
| 2015/0130100 A1 | 5/2015 | Fiegener | |
| 2015/0147424 A1 | 5/2015 | Bibas | |
| 2015/0258626 A1 | 9/2015 | Seufzer et al. | |
| 2016/0114432 A1 | 4/2016 | Ferrar et al. | |
| 2016/0136730 A1 | 5/2016 | McMurtry et al. | |
| 2016/0144571 A1 | 5/2016 | Philippi | |
| 2016/0282850 A1 | 9/2016 | Capobianco, Jr. | |
| 2016/0302469 A1 | 10/2016 | Din et al. | |
| 2016/0303806 A1 | 10/2016 | Mercelis | |
| 2017/0186143 A1* | 6/2017 | Ohno | B29C 67/00 |

\* cited by examiner

CALIBRATION SYSTEMS FOR CALIBRATING BUILD PLATFORMS OF ADDITIVE MANUFACTURING SYSTEMS AND RELATED PROGRAM PRODUCTS

BACKGROUND

The disclosure relates generally to additive manufacturing systems, and more particularly, to a calibration system for calibrating movable build platforms of the additive manufacturing systems and related program products for calibrating the movable build platforms.

Components or parts for various machines and mechanical systems may be built using additive manufacturing systems. Additive manufacturing systems may build such components by continuously layering powder material in predetermined areas and performing a material transformation process, such as sintering or melting, on the powder material. The material transformation process may alter the physical state of the powder material from a granular composition to a solid material to build the component. The components built using the additive manufacturing systems have nearly identical physical attributes as conventional components typically made by performing machining processes on stock material. However, these components can include certain geometrical features that can only be obtained through additive manufacturing methods.

A variety of operational characteristics for the devices and/or systems of the additive manufacturing system may affect the build of the component formed by additive manufacturing systems. For example, a position and/or orientation of a build platform may affect the quality and/or accuracy of the component built by the additive manufacturing system. The build platform may receive a build plate, which may be configured to allow the component to be built or formed by the additive manufacturing systems directly on the build plate. Because powder material is directly deposited or layered on the build plate, and energy emitting devices are used to materially transform (e.g., sinter, melt) the powder material on the build plate to form the component, it is important that the build plate and build platform be positioned and/or oriented in a desired manner during the build process. When the build plate and/or the build platform are not positioned and/or orientated in the desired manner (e.g., misaligned), the build quality and/or accuracy for the component may decrease because other features and/or processes may not be capable of being properly performed. For example, where the build plate and build platform are undesirably tilted or inclined, the powder material used to form the component may not be deposited in a desired location on the build plate and/or may be shifted or undesirably dispersed once deposited due to the inclination, which may reduce the thickness of the layer of deposited powder material. As a result, where powder material is deposited in an undesired location, the energy emitting devices performing the transformation process may not transform (e.g., sinter, melt) all the deposited powder material. Additionally, where powder material is undesirably shifted or dispersed, and the thickness of the layer of deposited powder material is increased, the energy emitting devices performing the transformation process may not transform (e.g., sinter, melt) the increased thickness of powder material. The improper positioning of the powder material and/or the reduced thickness in the powder material caused by the tilt or inclination of the build platform and the build plate, respectively, may result in structurally inferior areas or portions formed in the component. In some cases, this may ultimately reduce the operational efficiencies and/or operational life of the component built by the additive manufacturing systems.

SUMMARY

A first aspect of the disclosure provides an additive manufacturing system including: a movable build platform; and a calibration system operably connected to the movable build platform, the calibration system including: a reflective element operably coupled to the movable build platform; a first calibration model positioned above and vertically offset from the reflective element; a first camera positioned above the reflective element and substantially aligned with the first calibration model, the first camera visually aligned with the reflective element to capture a first reflective image of the first calibration model as reflected by the reflective element operably coupled to the movable build platform; and at least one computing device operably connected to the movable build platform and the first camera, the at least one computing device configured to calibrate the movable build platform by: adjusting an actual inclination of the movable build platform in response to determining the first reflective image of the first calibration model differs from a predetermined image of the first calibration model, wherein the predetermined image of the first calibration model corresponds to a desired inclination of the movable build platform.

A second aspect of the disclosure provides a calibration system operably connected to a movable build platform of an additive manufacturing system, the calibration system including: a reflective element operably coupled to the movable build platform; a first calibration model positioned above and vertically offset from the reflective element; a first camera positioned above the reflective element and substantially aligned with the first calibration model, the first camera visually aligned with the reflective element to capture a first reflective image of the first calibration model as reflected by the reflective element operably coupled to the movable build platform; and at least one computing device operably connected to the movable build platform and the first camera, the at least one computing device configured to calibrate the movable build platform by: adjusting an actual inclination of the movable build platform in response to determining the first reflective image of the first calibration model differs from a predetermined image of the first calibration model, wherein the predetermined image of the first calibration model corresponds to a desired inclination of the movable build platform.

A third aspect of the disclosure provides a computer program product including program code stored on a non-transitory computer readable storage medium, which when executed by at least one computing device, causes the at least one computing device to calibrate a movable build platform of an additive manufacturing system by performing processes including: adjusting an actual inclination of the movable build platform in response to determining a first reflective image of a first calibration model differs from a predetermined image of the first calibration model, the predetermined image of the first calibration model corresponds to a desired inclination of the movable build platform, wherein a first camera visually aligned with a reflective element positioned on the movable build platform is configured to capture the first reflective image of the first calibration model as reflected by the reflective element.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant machine components within additive manufacturing systems. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to additive manufacturing systems, and more particularly, to a calibration system for calibrating movable build platforms of the additive manufacturing systems and related program products for calibrating the movable build platforms.

These and other embodiments are discussed below with reference to FIGS. 1-13. However, those skilled in the art will readily appreciate that the detailed description given herein with respect to these Figures is for explanatory purposes only and should not be construed as limiting.

Figure 1:
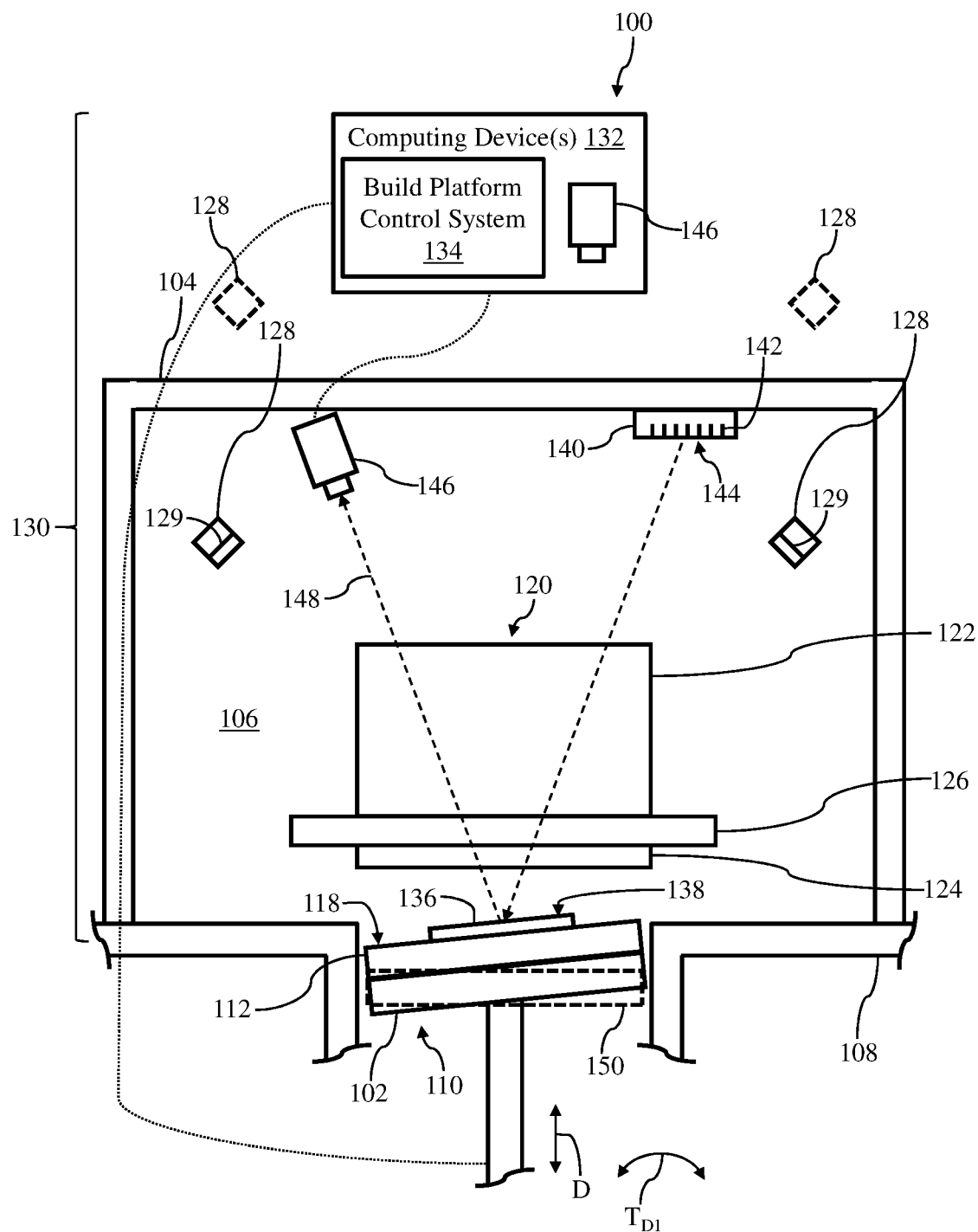
FIG. 1 shows a front view of an additive manufacturing system including a calibration system having a camera, a calibration model, and a reflective element, according to embodiments.
Figure 2:
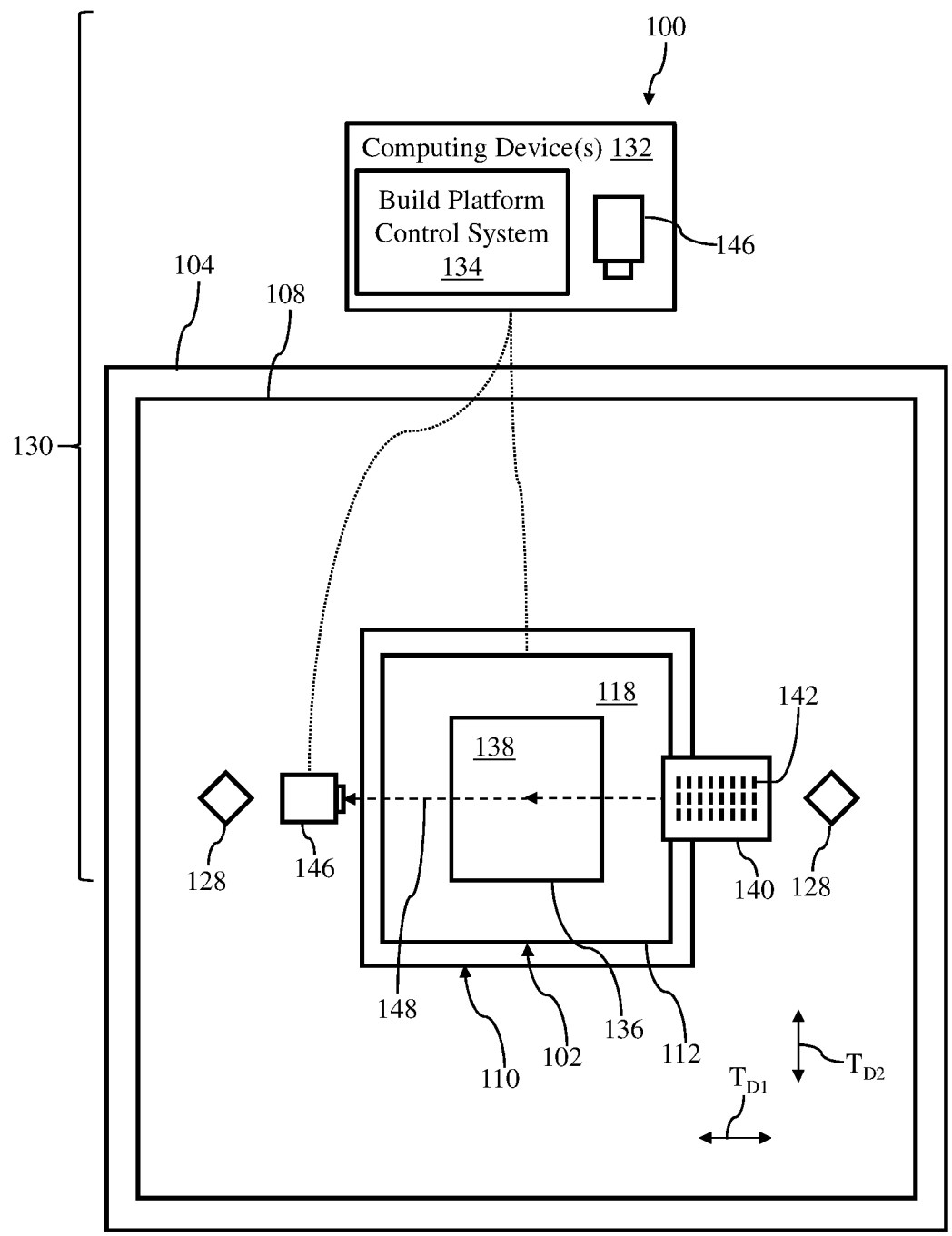
FIG. 2 shows a top view of the additive manufacturing and the calibration system of FIG. 1, according to embodiments.

FIGS. 1 and 2 show a front view and top view, respectively, of an additive manufacturing system 100. Specifically, FIG. 1 shows a front view of additive manufacturing system 100, and FIG. 2 shows a top view of additive manufacturing system 100, with a portion of an enclosure or build chamber removed to exposed internal components and/or features of additive manufacturing system 100. As discussed in detail herein, additive manufacturing system 100 may include a calibration system configured to calibrate a movable build platform of additive manufacturing system 100. Additive manufacturing system 100 including the calibration system and the process of calibrating the movable build platform of additive manufacturing system 100, as discussed herein, may maintain the quality and/or accuracy of a component built from powder material by additive manufacturing system 100 at constant level in real production environment and/or between distinct builds performed by additive manufacturing system 100.

As shown in FIG. 1, additive manufacturing system 100 (hereafter, "AMS 100") may include a movable build platform 102 (hereafter, "build platform 102"). Build platform 102 may be positioned within a build chamber 104 of AMS 100. That is, build platform 102 may be at least partially positioned or disposed within a chamber or cavity 106 of build chamber 104, such that build chamber 104 may substantially surround build platform 102. Additionally, build platform 102 may be positioned adjacent and/or within a support table 108 of AMS 100. As shown in FIG. 1, support table 108 may include an opening 110 configured to receive and/or substantially surround build platform 102. As discussed herein, support table 108 may receive, contact, and/or support various components of AMS 100. Additionally in a non-limiting example, support table 108 may be coupled to and/or may be included as part of build chamber 104, such that build chamber 104 and support table 108 substantially define cavity 106.

As shown in FIGS. 1 and 2, build platform 102 may be configured to receive a build plate 112. Specifically, build plate 112 may be positioned directly on and/or above build platform 102 and may extend into and/or adjacent cavity 106. In a non-limiting example shown in FIG. 1, build platform 102 may be configured to move in a direction (D)

for adjusting the height of build platform 102 and/or build plate 112. As discussed herein, build platform 102 may move in the direction (D) during a building process performed by AMS 100 to build a component (not shown) from a powder material (not shown) on build plate 112. In non-limiting examples, build platform 102 may be configured to move in the direction (D) during a building process performed by AMS 100 by any suitable system, device and/or mechanism including, but not limited to, hydraulic and/or actuator systems. In another non-limiting example, build platform 102 may be coupled to and/or in electronic communication with a leveling system (not shown). The leveling system may be configured to move build platform 102 in the direction (D), as well as, adjust the tilt and/or inclination of build platform 102 to position or orient the build platform 102 to be substantially level, planarly aligned with other components of AMS 100 and/or to include a desired inclination for the calibration and/or component build processes, as discussed herein.

Additionally, and as discussed herein, build platform 102 (and build plate 112 positioned thereon) may be configured to incline or tilt in various directions ($T_{D1}$, $T_{D2}$). Build platform 102 may be configured to incline or tilt in a first direction ($T_{D1}$) and/or a second direction ($T_{D2}$) (see, FIG. 2) to aid in the building of a component from powder material, and may include a unique and/or complex geometry or feature. Alternatively, build platform 102 may be misaligned, undesirably inclined, and/or undesirable tilted in a first direction ($T_{D1}$) and/or a second direction ($T_{D2}$) as a result of, for example, over adjustment by an operator of AMS 100 and/or improper grinding or planing (e.g., upper and lower sides not parallel or planar, non-uniform thickness and so on) of build plate 112 after performing a previous build process. In the non-limiting example shown in FIG. 1, build platform 102, and build platform 112 may be inclined or tilted in a first direction ($T_{D1}$). As discussed herein, determination and/or detection of the tilt and/or inclination of movable build platform 102 may aid in the calibration of movable build platform 102.

Build platform 102 may be formed from any suitable material that may receive and/or support the powder material and the component formed from the powder material, as discussed herein. Additionally, the size and/or geometry of build platform 102 of AMS 100 may be dependent on, at least in part, the amount of powder material utilized by AMS 100 to form the component, the size of the component, the geometry of the component formed by AMS 100, and/or the size of build plate 112 positioned directly on build platform 102.

Build chamber 104 may at least partially and/or substantially surround build platform 102 and build plate 112 positioned directly on build platform 102. Build chamber 104, along with support table 108, may be formed as any suitable structure and/or enclosure including build cavity 106 that may receive build platform 102, build plate 112 and/or additional components of AMS 100 that may be utilized to form a component. Build chamber 104 may be formed from any suitable material that may be capable of including and/or supporting the features of AMS 100. In non-limiting examples, build chamber 104 may be formed from metals, metal alloys, ceramics, polymers and other materials including similar physical, material and/or chemical characteristics. Additionally, the size and/or geometry of build chamber 104 may be dependent on, at least in part, the size and/or the geometry of the component formed by AMS 100.

Build plate 112 may be positioned on, retained on and/or releasably coupled to build platform 102 and may be utilized by AMS 100 to build components, as discussed herein. Build plate 112 may be positioned directly on, and releasably coupled to build platform 102 of AMS 100 using any suitable coupling technique and/or mechanism. For example, build plate 112 may be releasably coupled to build platform 102 using bolts, screws, hooks, clips, retention pins and the like. As a result of being releasably coupled to build platform 102, build plate 112 may move in the direction (D) along with build platform 102.

Build plate 112 may also include a build surface 118 that may receive powder material for building the component directly on build surface 118, as discussed herein. In a non-limiting example, and as discussed herein, it may be desired that build surface 118 of build plate 112 be in substantial planar alignment, substantially level and/or substantially even with support table 108 of AMS 100 prior to building the component from the powder material (e.g., pre-build state). However, because build platform 102 may be inclined or tilted (e.g., in first direction ($T_{D1}$)), as shown in FIG. 1, build surface 118 may not be in substantial planar alignment with support table 108 of AMS 100.

Build plate 112 may be made from any suitable material capable of withstanding the processes for building a component using AMS 100. In non-limiting examples, build plate 112 may be formed from stainless steel, aluminum, titanium, nickel, cobalt or iron alloys or any other material having similar physical, material and/or chemical characteristics. Additionally, the size and/or geometry of build plate 112 of AMS 100 may be dependent on, at least in part, the amount of powder material utilized by AMS 100 to form the component, the size of the component, the geometry of the component formed by AMS 100, and/or the size of build platform 102 configured to receive and releasably couple build plate 112.

AMS 100 may also include a recoater device 120. As shown in FIG. 1, recoater device 120 may be positioned within cavity 106. Specifically, recoater device 120 of AMS 100 may be positioned within cavity 106, and/or may be surrounded by build chamber 104 and support table 108. Recoater device 120 may also be positioned above, and may be (at least partially) aligned with build platform 102, support table 108, and/or build plate 112 positioned directly on build platform 102. As discussed herein, recoater device 120 may include, be coupled to, and/or operably connected to various components, devices and/or systems that may be configured to deposit powder material on build surface 118 of build plate 112, for subsequent transformation (e.g., sintering) to build component layer-by-layer using AMS 100. For clarity and ease of viewing, recoater device 120, and all its features and/or components, have been removed from AMS 100 shown in FIG. 2.

Recoater device 120 may include a powder material reservoir tank 122 (hereafter, "reservoir tank 122"). As shown in FIG. 1, reservoir tank 122 may be positioned within cavity 106 defined by build chamber 104, and may be positioned above build platform 102 and build plate 112, respectively. Reservoir tank 122 may be formed as any suitable component that may be configured to receive, contain and/or hold powder material (e.g., metal, polymer, ceramic and the like) that may be utilized in the build process to form build component on build plate 112, as discussed herein. In a non-limiting example, reservoir tank 122 may be formed from a tank, container, vessel, receptacle, chamber, hopper and/or the like. Additionally in a non-limiting example, reservoir tank 122 may be configured to deposit the powder material on build plate 112 for forming the build component layer-by-layer. Reservoir tank 122 may deposit the powder material on build plate 112 using any suitable material deposition component or device, and may deposit the powder material using any suitable material deposition technique or process.

As shown in FIG. 1, recoater device 120 may also include a blade 124. Blade 124 of recoater device 120 may be positioned below reservoir tank 122. That is, blade 124 may be positioned below reservoir tank 122, and may be positioned between build plate 112 and reservoir tank 122. In the non-limiting example, blade 124 may also be positioned above and directly adjacent build plate 112 positioned directly on build platform 102. Blade 124 may be coupled to and/or affixed to reservoir tank 122 via a blade holder 126 to form recoater device 120. That is, blade holder 126 may be positioned between, and affixed or coupled to each of reservoir tank 122 and blade 124, respectively, and may consequentially couple blade 124 to reservoir tank 122. As a result, and as discussed herein, when reservoir tank 122 moves to deposit powder material on build plate 112, blade 124 may move with reservoir tank 122. Blade 124 of recoater device 120 may level the powder material deposited by reservoir tank 122 during the build process performed by AMS 100. Specifically, blade 124 may spread, level, smooth, and/or flatten the powder material after it is deposited by reservoir tank 122 to ensure the deposited layer of powder material includes a desired thickness before the powder material is transformed, as discussed herein. In non-limiting examples, blade 124 of recoater device 120 may be formed from any suitable component, and any suitable material, that may be configured to level the deposited powder material to form an even, desired thickness for the deposited powder material prior to material transformation.

Recoater device 120 may also be coupled to a track system (not shown) of AMS 100. The track system may be configured to adjust a position of and/or move recoater device 120 within build chamber 104 of AMS 100, over build plate 112, during the component build process performed by AMS 100, as discussed herein. The track system may be formed as any suitable component, device and/or system that may be configured to adjust the position and/or move recoater device 120. For example, the track system may be formed as a four-post track system and cross-bar support that may be configured to move recoater device 120 in a direction in-and-out of the page, over build plate 112, during the component build process discussed herein. In other non-limiting examples, AMS 100 may include any suitable component and/or system configured to adjust the position of recoater device 120 when performing the component build process, as discussed herein. For example, recoater device 120 may be coupled and/or fixed to a movable armature that may adjust the position of recoater device 120 in the various required directions (e.g., direction (D), a direction in-and-out of the page) to perform the component build process, as discussed herein.

AMS 100 may also include at least one energy emitting device 128. As discussed herein, energy emitting device(s) 128 may be any device configured to perform a material transformation process (e.g., sintering, melting) on various powder materials (e.g., metal, polymer, ceramic and the like) used to form the component on build plate 112. As shown in FIGS. 1 and 2, energy emitting device(s) 128 of AMS 100 may be positioned substantially above build platform 102 and/or build plate 112 positioned directly on build platform 102. Additionally as shown in FIG. 1, energy emitting device(s) 128 may be positioned above recoater device 120. In the non-limiting example shown in FIG. 1, energy emitting device(s) 128 may be positioned within build chamber 104, and may be coupled to and/or fixed to build chamber 104. In another non-limiting example, energy emitting device(s) 128 may be positioned outside of and/or above build chamber 104 of AMS 100 (see, energy emitting device(s) 128 shown in phantom). Energy emitting device(s) 128 of AMS 100 may include at least one adjustable mirror 129. The position and/or inclination of mirror(s) 129 of energy emitting device(s) 128 may be (continuously) adjusted during the component build processes to direct and/or move the emitted energy (e.g., laser beam, electron beam) over build plate 112 to form the component, as discussed herein. In another non-limiting example, energy emitting device(s) 128 may be configured to at least partially rotate in order to form components on build plate 112 by performing build processes discussed herein. In additional non-limiting examples, energy emitting device(s) 128 may be coupled to a distinct track system (not shown) that may be configured to move energy emitting device(s) 128, individually, in various directions when performing build processes discussed herein.

Energy emitting device(s) 128 may be any suitable device configured to and/or capable of forming component on build plate 112 from powder material. Specifically, energy emitting device(s) 128 may be configured to and/or capable of transforming the powder material (e.g., sintering, melting), layer-by-layer, to form a component, as discussed herein. In a non-limiting example shown in FIGS. 1 and 2, energy emitting device(s) 128 may be any suitable laser or laser device configured to emit light capable of transforming the powder material. In other non-limiting examples (not shown), energy emitting device(s) 128 may include any other suitable radiant energy or irradiation device (e.g., electron beam) configured to transform the powder material including, but not limited to, a heat source, a radiation-emitting device, a microwave-emitting device and the like.

Two energy emitting devices 128 are shown and discussed herein with respect to AMS 100. However, it is understood that the number of energy emitting devices of AMS 100 shown in the figures is merely illustrative. As such, AMS 100 may include more or fewer energy emitting device(s) 128 than the number depicted and discussed herein.

During the component build process, powder or granular material may be added to predetermined areas of build surface 118 of build plate 112 using recoater device 120. Specifically, reservoir tank 122 of recoater device 120 may move over (e.g., direction in-and-out of the page) build platform 102/build plate 112, and may deposit powder material on build surface 118 of build plate 112. Additionally, and substantially simultaneous to the deposition, blade 124 of recoater device 120 may also spread, level, smooth, and/or flatten the deposited powder material on build plate 112 to have a substantially planar surface and/or to include a predetermined, desired thickness. Once deposited and leveled by recoater device 120, the powder material may subsequently be transformed (e.g., sintered, melted) by energy emitting device(s) 128 to form a layer of build component. Once the layer of powder material is transformed by energy emitting device(s) 128, build platform 102, and build plate 112 positioned directly on and coupled to build platform 102, may be adjusted and/or moved in a direction (D), within opening 110, away from and/or further below recoater device 120. The deposition, leveling, material transformation, and build platform 102 adjustment process may be continuously performed to build component layer-by-layer. Once the component is built on build surface 118 of build plate 112, the component may be removed and build plate 112, build plate 112 may be reused by AMS 100 and/or undergo another build process, as discussed herein, to have distinct component built on build surface 118.

As shown in FIGS. 1 and 2, AMS 100 may also include a calibration system 130. As discussed herein, calibration system 130, and its various components, may be operably connected to portions, components, devices, and/or systems of AMS 100 (e.g., movable build platform 102, and so on) to calibrate movable build platform 102. Additionally as discussed in detail herein, calibration system 130 and the processes of calibrating movable build platform 102 of AMS 100 using calibration system 130 may improve the quality and/or accuracy of a component built from powder material by AMS 100 by ensuring the movable build platform 102 includes, is positioned and/or oriented in a desired inclination prior to beginning the build process. By positioning the movable build platform 102 to the desired inclination, the powder material deposited by recoater device 120 may be deposited in a defined area of build surface 118 of build plate 112, to more accurately and precisely form the component.

Calibration system 130 may include at least one computing device(s) 132 configured to calibrate recoater device 120. Computing device(s) 132 may be hard-wired, wirelessly and/or operably connected to and/or in communication with various components of AMS 100 via any suitable electronic and/or mechanic communication component or technique. Specifically, computing device(s) 132 of calibration system 130 may be in electrical communication and/or operably connected to movable build platform 102 and/or camera(s) of AMS 100 (e.g., camera 146 described elsewhere herein). Computing device(s) 132, and its various components discussed herein, may be a single stand-alone system that functions separate from an operations system of AMS 100 (e.g., computing device) (not shown) that may control and/or adjust at least a portion of operations and/or functions of AMS 100, and its various components (e.g., build platform 102, recoater device 120, energy emitting device(s) 128, and so on). Alternatively, computing device(s) 132 and its components may be integrally formed within, in communication with and/or formed as a part of a larger control system of AMS 100 (e.g., computing device) (not shown) that may control and/or adjust at least a portion of operations and/or functions of AMS 100, and its various components.

In various embodiments, computing device(s) 132 can include a build platform control system 134 (hereafter, "control system 134") for calibrating movable build platform 102. As a result of computing device(s) 132 being in operable communication with movable build platform 102, control system 134 may also be in electronic communication and/or operably connected to movable build platform 102 of AMS 100, and may be configured to operate and/or move movable build platform 102. That is, and as discussed herein, computing device(s) 132 and/or control system 134 may be configured to calibrate movable build platform 102 by adjusting inclination (e.g., tilt) of movable build platform 102, based on desired, predetermined, and/or obtained inclination of movable build platform 102, to improve the quality and/or accuracy of a component built from powder material by AMS 100 at constant level in real production environment and/or between distinct builds performed by additive manufacturing system 100.

Calibration system 130 of AMS 100 may also include a reflective element 136. As shown in FIGS. 1 and 2, reflective element 136 may be positioned above build movable platform 102. More specifically, reflective element 136 may be positioned above, positioned on, and/or may be operably coupled to movable build platform 102. In the non-limiting example shown in FIGS. 1 and 2 where a build plate 112 is positioned directly on movable build platform 102, reflective element 136 of calibration system 130 may be positioned directly on build surface 118 of build plate 112. In other non-limiting examples discussed herein, build platform 102 may be calibrated using calibration system 130 without build plate 112 positioned thereon. In these non-limiting examples, reflective element 136 may be positioned directly on movable build platform 102 (see, FIG. 7), or alternatively, reflective element 136 may be formed integral with and/or integrally within movable build platform 102 (see, FIG. 8).

Reflective element 136 may include a substantially exposed, reflective surface 138 positioned above build platform 102. Additionally as shown in FIGS. 1 and 2, reflective surface 138 of reflective element 136 may be exposed within, positioned within and/or positioned adjacent cavity 106 of build chamber 104. Reflective element 136 including reflective surface 138 may be formed as any suitable light-reflecting object that may reflect an image of other components of calibration system 130 and/or AMS 100 for calibrating movable build platform 102, as discussed herein. For example, reflective element 136 of calibration system may be formed as a planar mirror, and reflective surface 138 may be substantially planar and/or linear to reflect an image of other components of calibration system 130 and/or AMS 100 for calibrating movable build platform 102, as discussed herein.

As shown in FIGS. 1 and 2, calibration system 130 may also include a calibration model 140. Calibration model 140 may be positioned above reflective element 136. More specifically, calibration model 140 may be positioned above, and may be vertically offset and/or at least partially misaligned vertically from reflective element 136. Calibration model 140 may be positioned in various locations within and/or adjacent build chamber 104 of AMS 100 and may be visually aligned and/or capable of being reflected by reflective element 136 to aid in calibrating movable build platform 102, as discussed herein. In the non-limiting example shown in FIG. 1, calibration model 140 may be positioned on and/or coupled to build chamber 104 of AMS 100. In another non-limiting example, calibration model 140 may be positioned within cavity 106 of build chamber 104, above reflective element 136. In additional non-limiting examples, calibration model 140 may be positioned above, adjacent to, and/or substantially outside of cavity 106 of build chamber 104, so long as calibration model 140 is still visually aligned and/or capable of being reflected by reflective element 136, as discussed herein.

As shown in FIGS. 1 and 2, and as discussed herein in detail, calibration model 140 may include a plurality of reference lines 142 (shown in phantom in FIG. 2). Reference lines 142 of calibration model 140 may be formed on a surface 144 of calibration model 140 that may be substantially exposed and/or opposite reflective element 136. As a result of being formed on surface 144 of calibration model 140, the plurality of reference lines 142 may be visible and/or reflected, along with visually aligned calibration model 140, by reflective element 136. As discussed herein, the plurality of reference lines 142 may aid in calibrating movable build platform 102 using calibration system 130, as discussed herein.

Additionally, calibration system 130 may also include at least one camera 146. Camera 146 may be in electronic communication and/or operably connected to computing device(s) 132 and/or control system 134, and may be configured to capture a reflective image (see, FIG. 4) of calibration model 140, as reflected by reflective element 136, to be utilized in the calibration process discussed herein. Similar to calibration model 140, Camera 146 may be positioned in various locations within and/or adjacent build chamber 104 of AMS 100 and may be visually aligned with reflective element 136 in order to capture the reflective image of calibration model 140 produced by reflective element 136, as discussed herein. Additionally, camera 146 may be positioned above reflective element 136, and may be substantially aligned with calibration model 140. In the non-limiting example shown in FIGS. 1 and 2, camera 146 may be coupled to build chamber 104 of AMS 100, and may be substantially aligned in a vertical and a horizontal direction.

Light or image reflective lines 148 shown in FIGS. 1 and 2, may reference and/or represent how camera 146 captures the reflective image of calibration model 140 produced by reflective element 136. Specifically, based on calibration model 140 and camera's 146 position within AMS 100 and/or being visually aligned with reflective element 136, and the planar configuration of reflective element 136 (e.g., planar mirror), a reflective image of calibration model 140 may be generated, and/or produced by reflective element 136, and reflective surface 138 of reflective element 136 may direct the reflective image of calibration model 140 toward camera 146. Camera 146 in turn may capture the reflective image of calibration model 140, including the plurality of reference lines 142, as generated by reflective element 136. As discussed in detail herein, where build platform 102 and reflective element 136 is substantially tilted and/or inclined, the incident angle of reflection may be altered, and as a result, the reflective image of calibration model 140 captured by camera 146 may show the plurality of reference lines 142 of calibration model 140 as shifted or displaced. The shift or displacement in the plurality of reference lines 142 of calibration model 140 may be utilized to detect the inclination of build platform 102, and subsequently may be used to calibration movable build platform 102, as discussed herein.

Camera 146 of calibration system 130 may be any suitable device, component, or system configured to capture the reflective image of calibration model 140, as reflected by reflective element 136. For example, and as shown in FIGS. 1 and 2, camera 146 may be a video camera system configured to capture video images of the reflective image of calibration model 140. In other non-limiting examples, camera 146 may formed or configured as a still camera or photography camera configured to capture images of the reflective image of calibration model 140. In the non-limiting example shown in FIGS. 1 and 2, a single camera 146 is shown. However, in other non-limiting examples, calibration system 130 of AMS 100 may include more cameras 146 (see, FIGS. 9-10). That is, the number of camera(s) 146 shown in FIGS. 1 and 2 is merely illustrative and non-limiting.

The calibration process for calibrating movable build platform 102 of AMS 100 may now be discussed with respect to FIGS. 1-5. In a non-limiting example, the calibration process for calibrating movable build platform 102 may be performed at a "pre-build" stage. The pre-build stage may be before a powder material is deposited on build plate 112 by recoated device 120, and before any portion of component is built on build plate 112. By performing the calibration process for calibrating movable build platform 102 in the pre-build stage (e.g., before beginning to build the component from powder material on build plate 112), it may ensure that build platform 102 is positioned within AMS 100 at a desired inclination prior to performing the build process discussed herein. This may in turn improve the build quality and/or accuracy of the component built by AMS 100 at constant level in real production environment and/or between distinct builds performed by additive manufacturing system 100.

Initially in the pre-build stage, a desired inclination 150 (see, FIG. 1) (shown in phantom) of movable build platform 102 may be predetermined. Desired inclination 150 for movable build platform 102 may be predetermined and/or known by calibration system 130, and more specifically computing device(s) 132 and/or control system 134 of calibration system 130, and may be used for calibrating movable build platform 102, as discussed herein. As shown in the non-limiting example in FIG. 1, desired inclination 150 of movable build platform 102 may be positioning and/or orienting movable build platform 102 to be substantially parallel with support table 108 of AMS 100. Additionally in the non-limiting example, desired inclination 150 of movable build platform 102 may move, or adjust the position of build plate 112 and/or reflective element 136, such that when movable build platform 102 is in the desired inclination 150, build surface 118 of build plate 112 and/or reflective element 136 may be substantially parallel and/or planar with support table 108 in the pre-build stage. In other non-limiting examples, desired inclination 150 may be distinct from the example shown in FIG. 1, and may include angular orientations and/or positioning for build platform 102, such that movable build platform 102, and build plate 112 positioned thereon, are not planar and/or parallel with support table 108 of AMS 100.

Desired inclination 150 may be based on operational characteristics for AMS 100 and/or build characteristics of the component built by AMS 100. More specifically, desired inclination 150 for movable build platform 120 may be known, predetermined and/or calculated based on modeled, determined, and/or intended operational characteristics for AMS 100, and its various components utilized in the build process (e.g., movable build platform 102, recoater device 120, energy emitting device(s) 128 and so on), and/or build characteristics or properties of the component built by AMS 100. In non-limiting examples, operational characteristics for AMS 100 may include, but are not limited to, the number of energy emitting device(s) 128 of AMS 100, the range of movement for energy emitting device(s) 128 (e.g., fixed but rotatable, energy emitting device track system and the like), type of energy emitting device(s) 128 of AMS 100, energy emitting device(s) 128 position within AMS 100 relative to build plate 112, size of recoater device 120, deposition rate of powder material for recoater device 120, size of build plate 112, range of motion for build platform 102 including build plate 112, and the like. In non-limiting examples, build characteristics for the component formed on build plate 112 from powder material may include, but are not limited to, the composition of the powder material, the size of the component, the features and/or geometry of the component, the number of layers of powder material deposited to form the component, and so on.

Desired inclination 150 of movable build platform 102 may correspond to a position and/or orientation of movable build platform 102 that will improve build quality and/or accuracy for AMS 100. That is, by positioning and/or orienting movable build platform 102 to desired inclination 150, movable build platform 102 may be positioned and/or oriented within AMS 100 to ensure an accurate and/or improved build of the component, based on the layer-by-layer construction as discussed herein with respect to the build process of AMS 100. For example, by positioning and/or orienting movable build platform 102 to desired inclination 150, it may ensure that the powder material is deposited onto build plate 112 by recoated device 120 in an exact, desired location of build plate 112. Additionally, and/or in view of depositing the powder material onto build plate 112 in the exact, desired location, positioning and/or orienting movable build platform 102 to desired inclination 150 may ensure that the deposited powder material is completely and/or accurately transformed by energy emitting device(s) 128 when forming the component.

Figure 3:
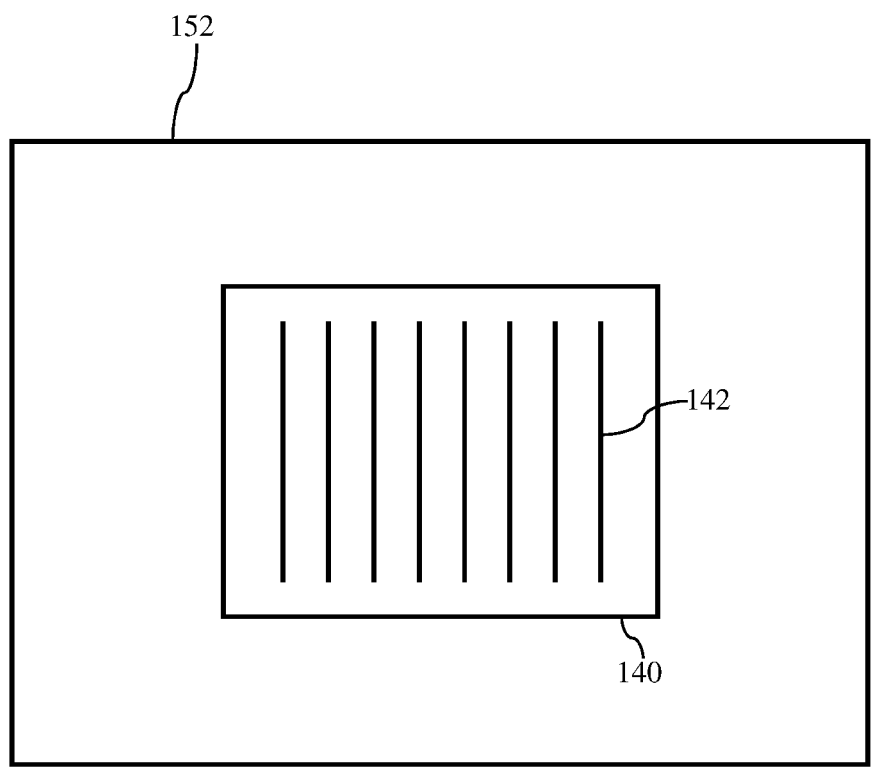
FIG. 3 shows a predetermined image of the calibration model of the calibration system of FIG. 1, according to embodiments.

Additionally, and as shown in FIG. 3, a predetermined image 152 of calibration model 140 may be known in the pre-build stage. Predetermined image 152 of calibration model 140 of calibration system 130 may be predetermined and/or known by computing device(s) 132 and/or control system 134 of calibration system 130, and may be used for calibrating movable build platform 102, as discussed herein. As shown in FIG. 3, predetermined image 152 of calibration model 140 may include an image of calibration model 140 including the plurality of reference lines 142 formed thereon positioned. Additionally, predetermined image 152 of calibration model 140 may correspond to desired inclination 150 of movable build platform 102. More specifically, predetermined image 152 may depict an image of calibration model 140 of calibration system 130 that may be captured by camera 146 when movable build platform 102 is positioned and/or oriented in desired inclination 150. As such, and as discussed herein, predetermined image 152 may depict the plurality of reference lines 142 of calibration model 140 in a desired position on and/or within predetermined image 152.

In a non-limiting example, predetermined image 152 of calibration model 140 may be physically and/or manually captured using camera 146 of calibration system 130. In this non-limiting example, camera 146 may capture predetermined image 152 of calibration model 140 after movable build platform 102 is adjusted to predetermined, desired inclination 150, and captured predetermined image 152 may be stored by computing device(s) 132 and/or control system 134 of calibration system 130 for calibrating movable build platform 102 at a later time. In another non-limiting example, predetermined image 152 may be generated, and/or calculated by computing device(s) 132 and/or control system 134 of calibration system 130. That is, knowing the configuration of the plurality of reference lines 142 on calibration model 140, and knowing desired inclination 150 of movable build platform 102 based on operational characteristics for AMS 100 and/or build characteristics of the component built by AMS 100, computing device(s) 132 and/or control system 134 of calibration system 130 may calculate and/or generate predetermined image 152 of calibration model 140.

Continuing the example discussed above, when movable build platform 102 is positioned and/or oriented in desired inclination 152, build platform 102, build plate 112 and/or reflective element 136 of calibration system 130 may be substantially parallel with support table 108 of AMS 100. As a result, predetermined image 152 may depict calibration model 140 substantially in the middle and/or center of predetermined image 152 for desired inclination 150 of movable build platform 102. That is, where reflective element 136 of calibration system 130 is substantially planar, not angled/tilted, and/or parallel with table support 108, calibration model 140 may be depicted, formed, and/or positioned substantially in the center and/or middle of predetermined image 152. Additionally in the non-limiting example, the center and/or middle positioning of calibration model 140, and the plurality of reference lines 142, on predetermined image 152 may be considered the desired position for the plurality of references lines 142 on predetermined image 152. As discussed herein, where movable build platform 102 is angled, tilted and/or inclined, the position of calibration model 140 may deviate from the center and/or middle of captured images (e.g., predetermined image 152, reflective image (see, FIG. 4).

Figure 4:
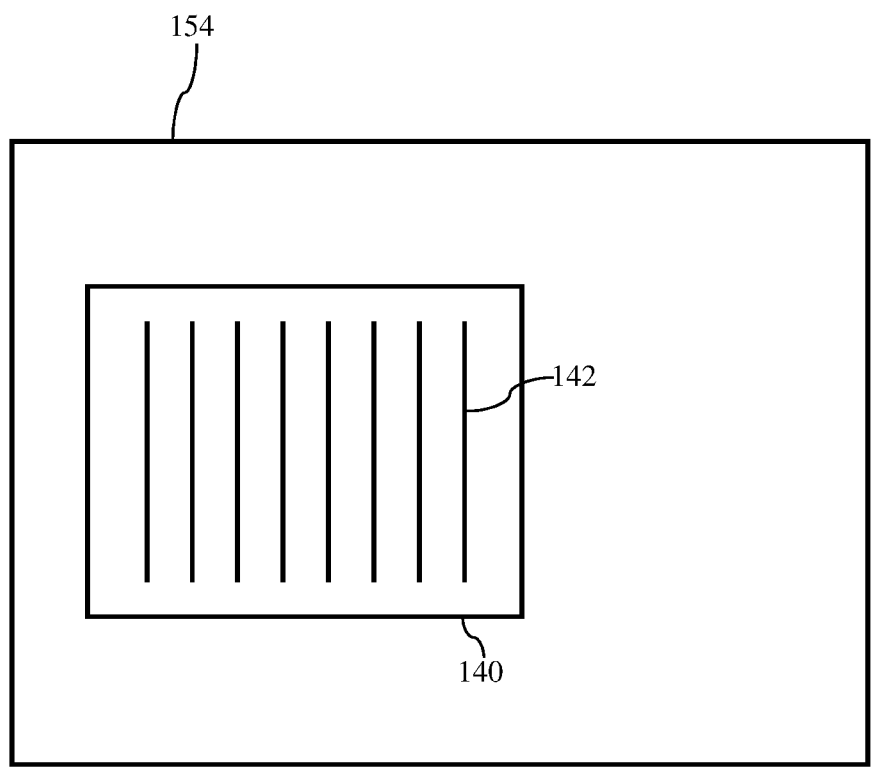
FIG. 4 shows a reflective image of the calibration model of the calibration system of FIG. 1, according to embodiments.

FIG. 4 shows a reflective image 154 of calibration model 140 of calibration system 130 captured during the pre-build stage. As discussed herein with respect to FIG. 1, reflective image 154 of calibration model 140 may be captured by camera 146 of calibration system 130. More specifically, based on calibration model 140 and camera 146 may be visually aligned with reflective element 136, and the planar configuration of reflective element 136 (e.g., planar mirror), reflective image 154 of calibration model 140 may be generated, and/or produced by reflective element 136, and reflected toward camera 146. Camera 146 may in turn capture reflective image 154 of calibration model 140, including the plurality of reference lines 142. In the non-limiting example shown in FIG. 4, reflective image 154 of calibration model 140 captured by camera 146 may depict the plurality of reference lines 142 of calibration model 140 shifted or displaced from the center of the image as a result of build platform 102 and reflective element 136 being substantially tilted and/or inclined in a first direction of tilt ($T_{D1}$) (see, FIG. 1). The shift or displacement in the depicted position of reference lines 142 in reflective image 154 may be a result of the incident angle of reflection being altered because of the tilt or incline of reflective element 136. Additionally, and as discussed herein, the shift or displacement for the plurality of reference lines 142 in reflective image 154 may be the actual position of the plurality of reference lines 142 of calibration model 140, which may be used to calibrate movable build platform 102. The direction and/or distance in the shift or displacement of reference lines 142 of calibration model 140 captured in reflective image 154 may be dependent, at least in part on, the direction of tilt or inclination of build platform 102 (and reflective element 136), the severity of the tilt or inclination (e.g., angle), and the like.

Once predetermined image 152 of calibration model 140 is determined and/or obtained by computing device(s) 132 and/or control system 134, and reflective image 154 of calibration model 140 is captured by camera 146 in the pre-build stage, system 134 of computing device 132 can compare predetermined image 152 and reflective image 154 to calibrate movable build platform 102. More specifically, the actual position of the plurality of reference lines 142 of calibration model 140 captured in reflective image 154 may be compared to the desired position of the plurality of reference lines 142 of calibration model 140 depicted in predetermined image 152.

Figure 5:
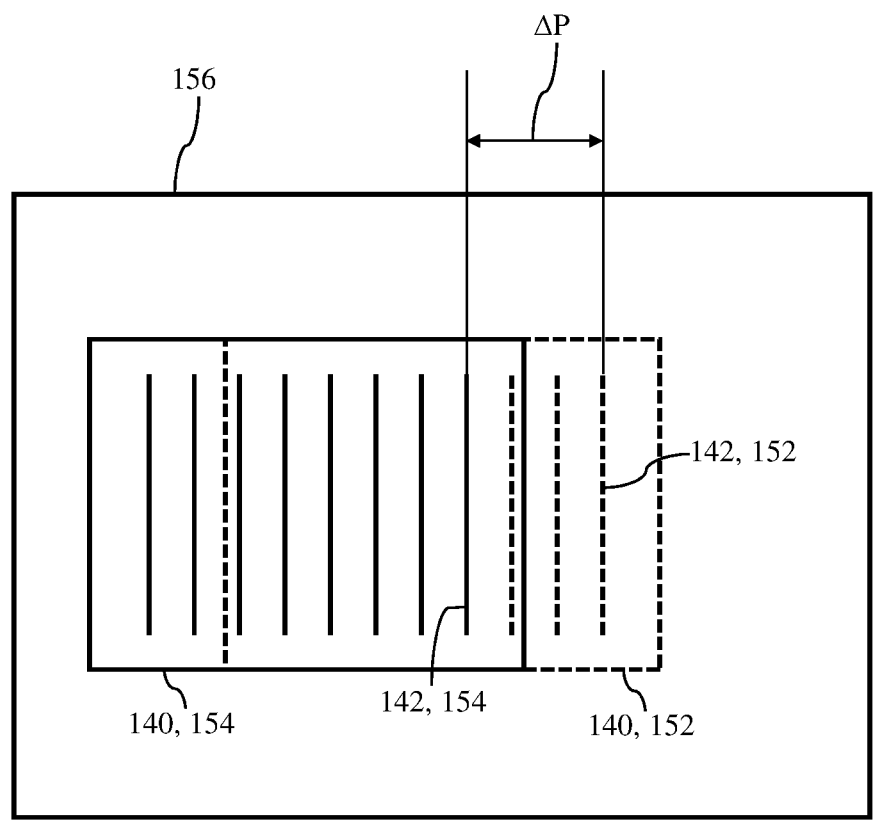
FIG. 5 shows a comparative image of the predetermined image of FIG. 3 and the reflective image of FIG. 4, according to embodiments.

Turning to FIG. 5, a comparative image 156 including a depiction of calibration model 140 of predetermined image 152 (shown in phantom), and calibration model 140 of captured reflective image 154 may be shown and used to calibrate movable build platform 102. In the non-limiting example, control system 134 of computing device 132 can determine deviation(s) relating to the plurality of reference lines 142 depicted in predetermined image 152 and reflective image 154 comparing predetermined image 152 and reflective image 154 and/or analyzing comparative image 156. The determined deviation(s) may aid in calibrating movable build platform 102 of AMS 100. For example, a positional deviation (ΔP) may be determined between the plurality of reference lines 142 of calibration model 140 captured in the reflective image 154 and the plurality of reference lines 142 of calibration model 140 captured in predetermined image 152. Positional deviation (ΔP) may be determined by comparing and/or measuring a distance and/or inclination between the actual position of at least one reference line 142 in reflective image 154 and the same, corresponding reference line(s) 142 depicted in predetermined image 152. Additionally, determining positional deviation (ΔP) may include determining the direction in which the plurality of reference lines 142 in reflective image 154 are shifted and/or displaced with respect to the plurality of reference lines 142 depicted in predetermined image 152.

In a non-limiting example, determined positional deviation (ΔP), and/or determining the distance in the shift or displacement for the actual position of the plurality of reference lines 142 in reflective image 154 from the plurality of reference lines 142 depicted in predetermined image 152 may be used to calibration movable build platform 102. In the non-limiting example, computing device(s) 132 and/or control system 134 may use positional deviation (ΔP) and determine the actual inclination of movable build platform 102, and calibrate movable build platform 102 accordingly, as discussed herein.

If it is determined that the actual position of the plurality of reference lines 142 of calibration model 140 captured in the reflective image 154 do not deviate and/or differ from the desired position of the plurality of reference lines 142 of calibration model 140 captured in predetermined image 152 (e.g., Δ=0), than calibration system 130 may determine movable build platform 102 is positioned and/or oriented in desired inclination 150. As such, calibration system 130 may not calibrate movable build platform 102 because movable build platform 102 may be positioned and/or oriented in desired inclination 150.

However, if it is determined that the actual position of the plurality of reference lines 142 in reflective image 154 positionally deviate (ΔP) from the desired position of the plurality of reference lines 142 in predetermined image 152 (e.g., ΔP≠0), than calibration system 130 may calibrate movable build platform 102. Calibration system 130 may calibrate movable build platform 102 by adjusting the actual inclination of movable build platform 102 within AMS 100. In a non-limiting example, calibration system 130 may adjust the actual inclination of movable build platform 102 by altering the actual inclination of movable build platform 102 until the actual inclination is identical to desired inclination 150 of movable build platform 102 (see, FIG. 1). Using predetermined image 152, reflective image 154, comparative image 156, and/or determined positional deviation (ΔP), calibration system 130 may determine and/or calculate the exact movement, adjustment and/or positional/orientation alteration for movable build platform 102 to make the actual inclination of movable build platform 102 identical to desired inclination 150.

Calibration system 130 may adjust the actual inclination of movable build platform 102 using various components of AMS 100. In a non-limiting example shown in FIG. 1, calibration system 130, and more specifically computing device(s) 132 and/or control system 134, may be in communication with and/or operably connected to movable build platform 102. In response to determining that calibration system 130 should calibrate movable build platform 102, computing device(s) 132 and/or control system 134 of calibration system 130 may adjust the actual inclination of movable build platform 102 by moving and/or adjusting the position of movable build platform 102 in the direction (D), and/or various incline or tilt directions ($T_{D1}$, $T_{D2}$).

Calibrating movable build platform 102, and more specifically adjusting the actual inclination of movable build platform 102, may ensure that movable build platform 102 is positioned and/or oriented identical to desired inclination 150, resulting in improved build quality and/or accuracy for AMS 100. That is, calibrating movable build platform 102 to desired inclination 150 may ensure an accurate and/or improved build of the component (e.g., accurate powder material deposition, accurate transformation of powder material), based on the build process of AMS 100, as discussed herein. Accurate and/or improved build of the component may ultimately result in improved build quality, operational characteristics, and/or operational life of the component build by AMS 100.

Figure 6:
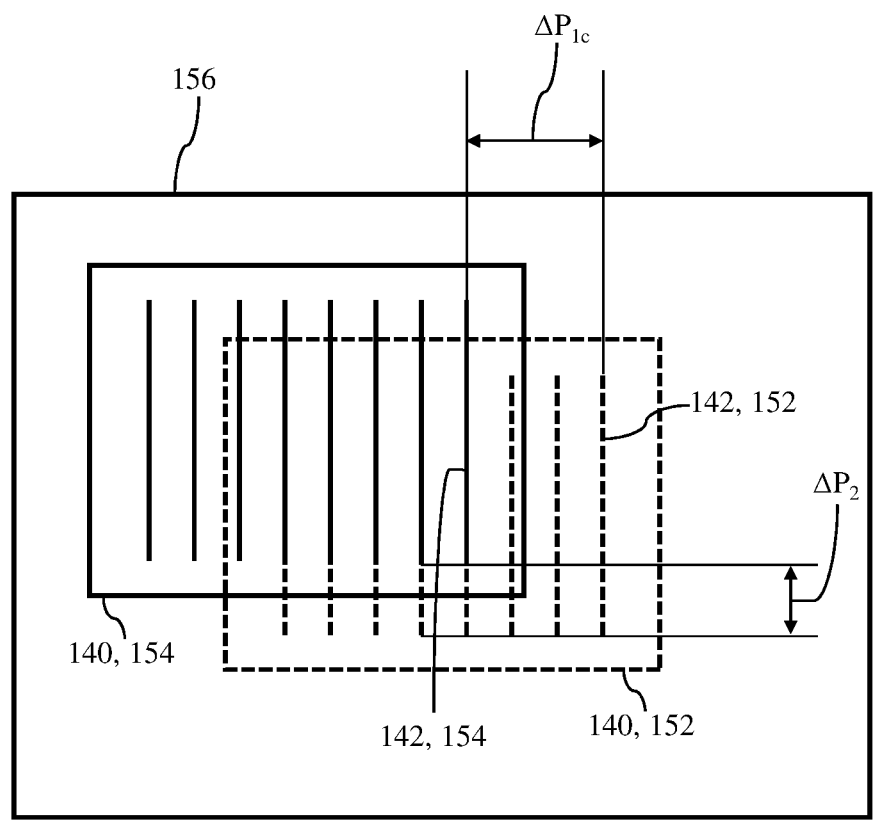
FIG. 6 shows a comparative image of the predetermined image of FIG. 3 and the reflective image of FIG. 4, according to additional embodiments.

FIG. 6 shows another comparative image 156 including a depiction of calibration model 140 of predetermined image 152 (shown in phantom), and calibration model 140 of reflective image 154 captured by camera 146 (see, FIG. 1). Distinct from FIG. 5, calibration model 140, and the plurality of reference lines 142, of captured reflective image 154 shown in FIG. 6 may be shifted or displaced in two directions. That is, and as a result of movable build platform 102 being tilted or inclined in two directions (e.g., $T_{D1}$, $T_{D2}$) (see, FIG. 2), captured reflective image 154 of calibration model 140 may depict the plurality of reference lines 142 shifted or displaced in two directions as well. Although shifted or displaced in two directions, calibration system 130 may be configured to determined positional deviations for the plurality of reference lines 142 of calibration model 140 in reflective image 154, and ultimately calibrate movable build platform 102. As similarly discussed herein, a first positional deviation ($\Delta P_1$) may be determined by comparing and/or measuring a distance between the actual position of at least one reference line 142 in reflective image 154 and the same, corresponding reference line(s) 142 depicted in predetermined image 152. Additionally, a second positional deviation ($\Delta P_2$) may be determined by comparing and/or measuring a distance between the actual position of a reference point (e.g., end of reference line) for at least one reference line 142 in reflective image 154 and the same, corresponding reference point in the same, corresponding reference line(s) 142 depicted in predetermined image 152. Determining both positional deviations ($\Delta P_1$, $\Delta P_2$) may aid in the calibration of movable build platform 102.

Figure 7:
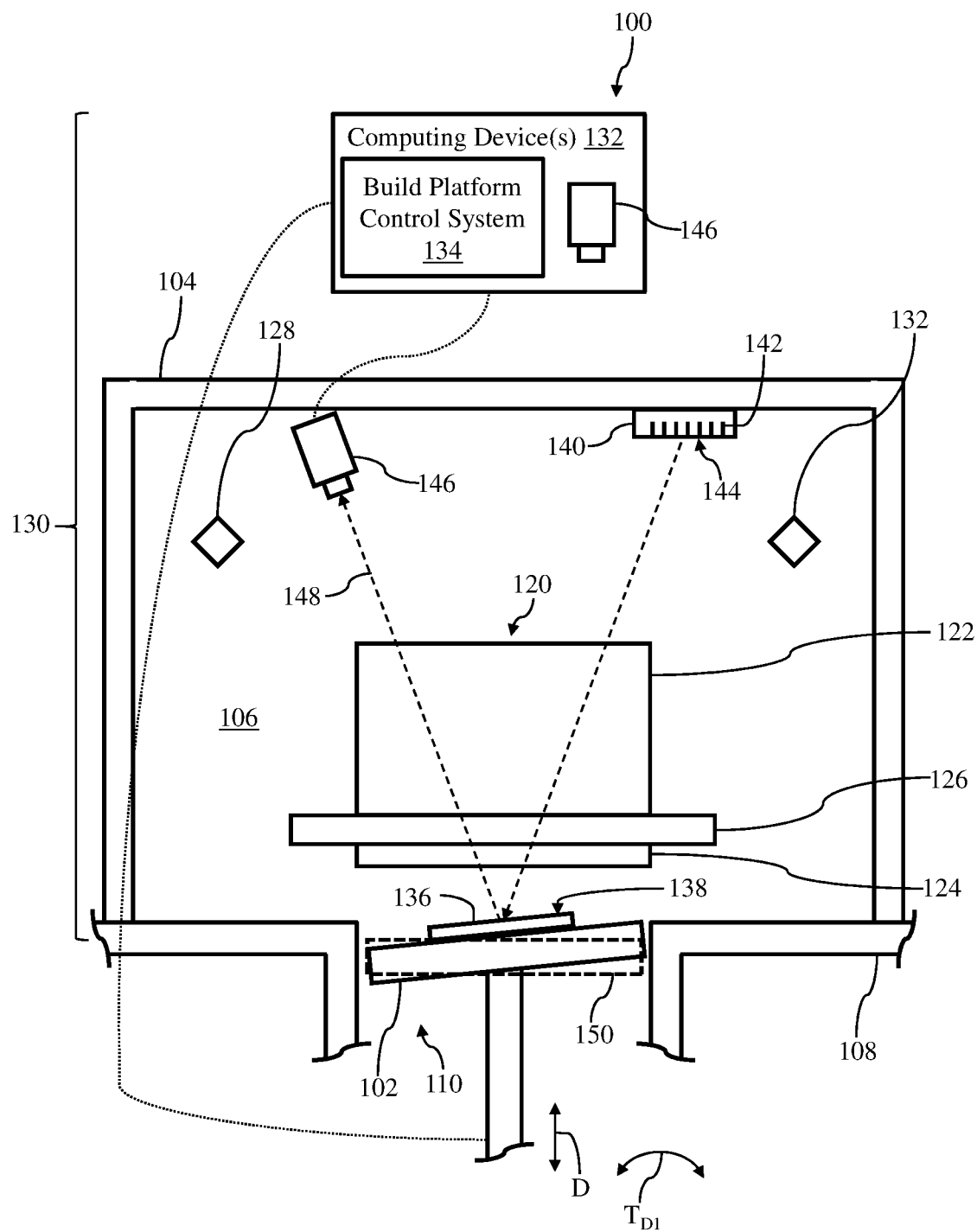
FIG. 7 shows a front view of an additive manufacturing system including a calibration system having a camera, a calibration model, and a reflective element, according to further embodiments.
Figure 8:
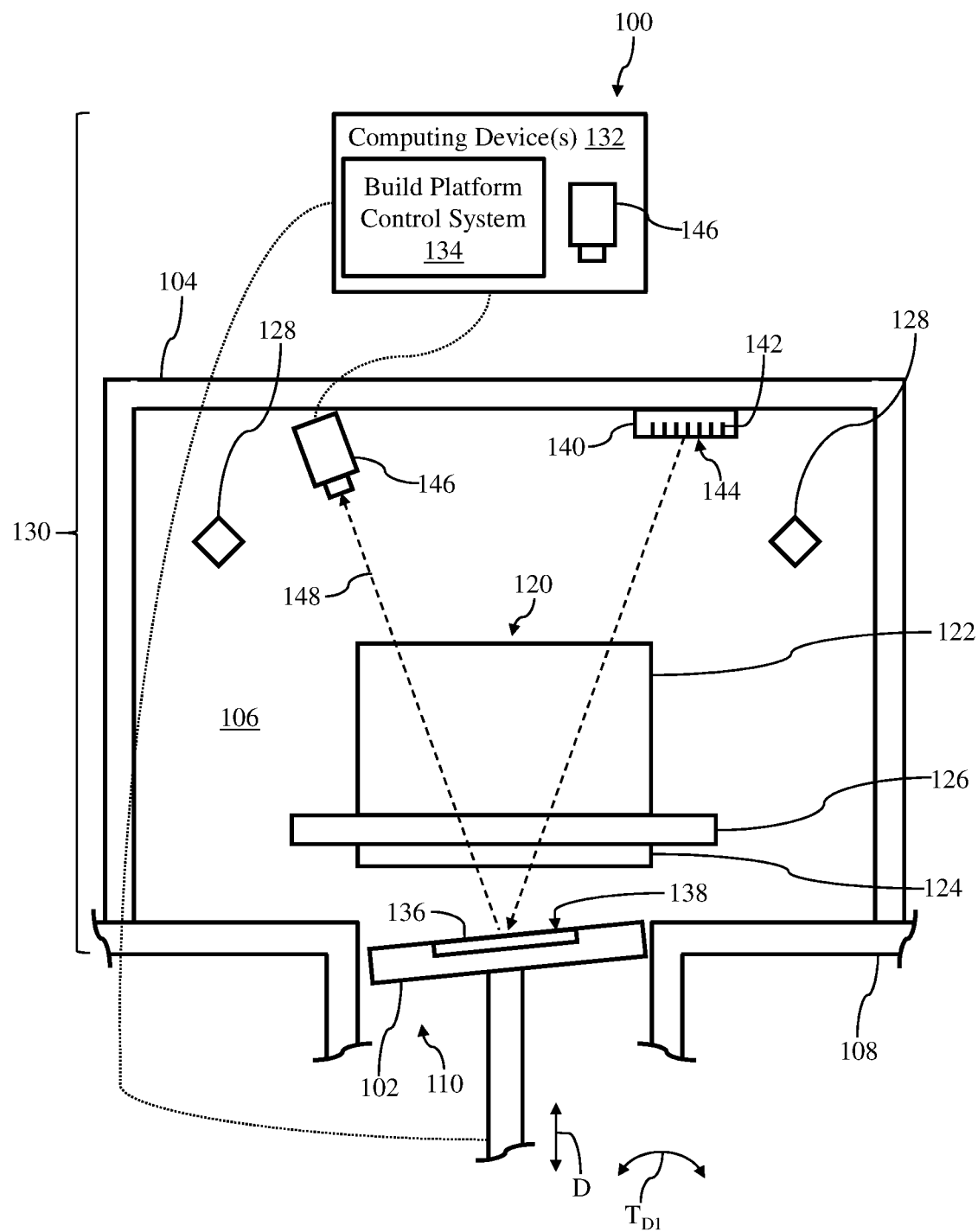
FIG. 8 shows a front view of an additive manufacturing system including a calibration system having a camera, a calibration model, and a reflective element, according to another embodiment.

FIGS. 7 and 8 show front views of various non-limiting examples of AMS 100. In the various non-limiting examples shown in FIGS. 7 and 8, AMS 100 and/or calibration system 130 may include distinct components and/or components positioned in distinct areas of AMS 100, as discussed in detail herein. It is understood that similarly numbered and/or named components may function in a substantially similar fashion. Redundant explanation of these components has been omitted for clarity.

In the non-limiting example shown in FIG. 7, AMS 100 may not include build plate 112 positioned on build platform 102. Specifically, because AMS 100 may calibrate movable build platform 102 during a pre-build stage of the build process, build plate 112 may not yet be positioned within cavity 106 of AMS 100 and/or on build platform 102 before calibration system 130 calibrates movable build platform 102. Rather in the non-limiting example, reflective element 136 of calibration system 130 may be positioned directly on movable build platform 102. Reflectively element 136 may be positioned directly on and/or may be coupled to movable build platform 102 to perform the calibration process for movable build platform 102 of AMS 100, as discussed herein. Once movable build platform 102 is calibrated (e.g., desired inclination 150) using calibration system 100, reflective element 136 may be removed from movable build platform 102, and/or may be replaced with build plate 112 in order for AMS 100 to begin the build process of forming the component from powder material.

In the non-limiting example shown in FIG. 8, and similar to FIG. 7, AMS 100 may not include build plate 112 positioned on build platform 102. However, distinct from FIG. 7, calibration system 130 shown in FIG. 8 may include reflective element 136 formed integrally within movable build platform 102. That is, reflective element 136 of calibration system 130 may be formed integral with and/or may be positioned within movable build platform 102 of AMS 100 to perform the calibration process discussed herein. Once movable build platform 102 is calibrated (e.g., desired inclination 150) using calibration system 100, reflective element 136 may remain in movable build platform 102. As a result, build plate 112 may be positioned directly on and/or over movable build platform 102 and reflective element 136 to allow AMS 100 to begin the build process of forming the component from powder material.

Figure 9:
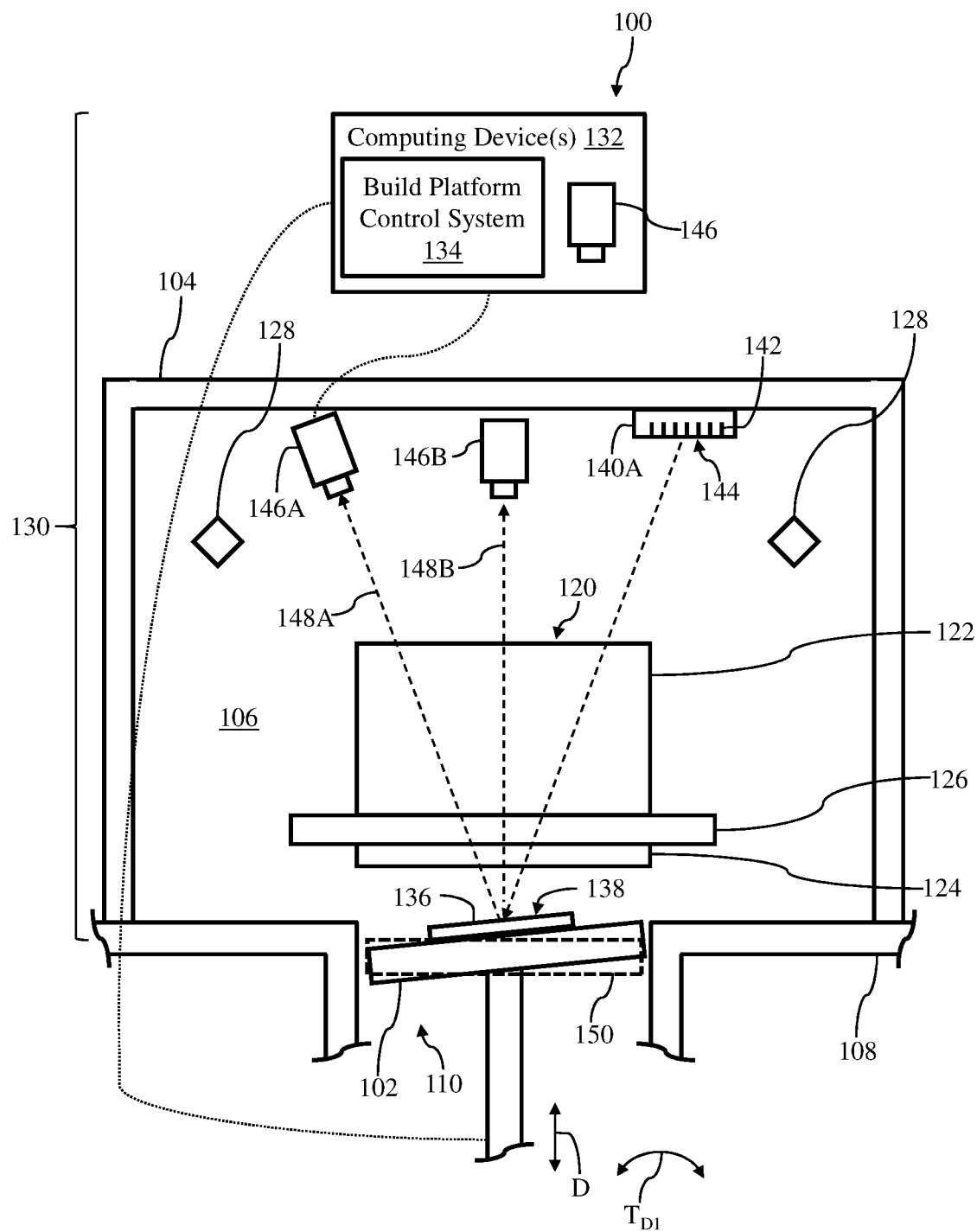
FIG. 9 shows a front view of an additive manufacturing system including a calibration system having two cameras, two calibration models, and a reflective element, according to embodiments.
Figure 10:
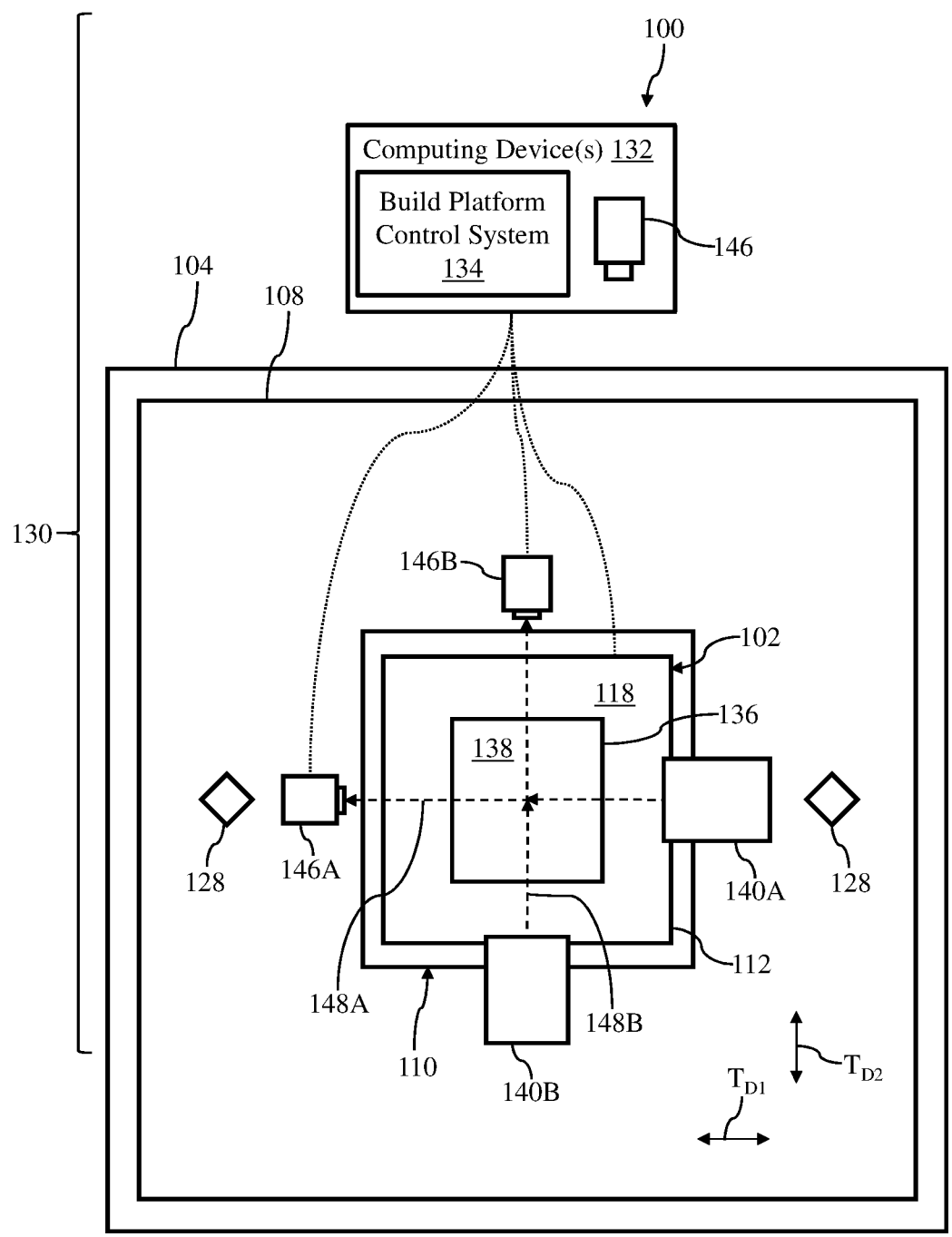
FIG. 10 shows a top view of the additive manufacturing and the calibration system of FIG. 9, according to embodiments.
Figure 11:
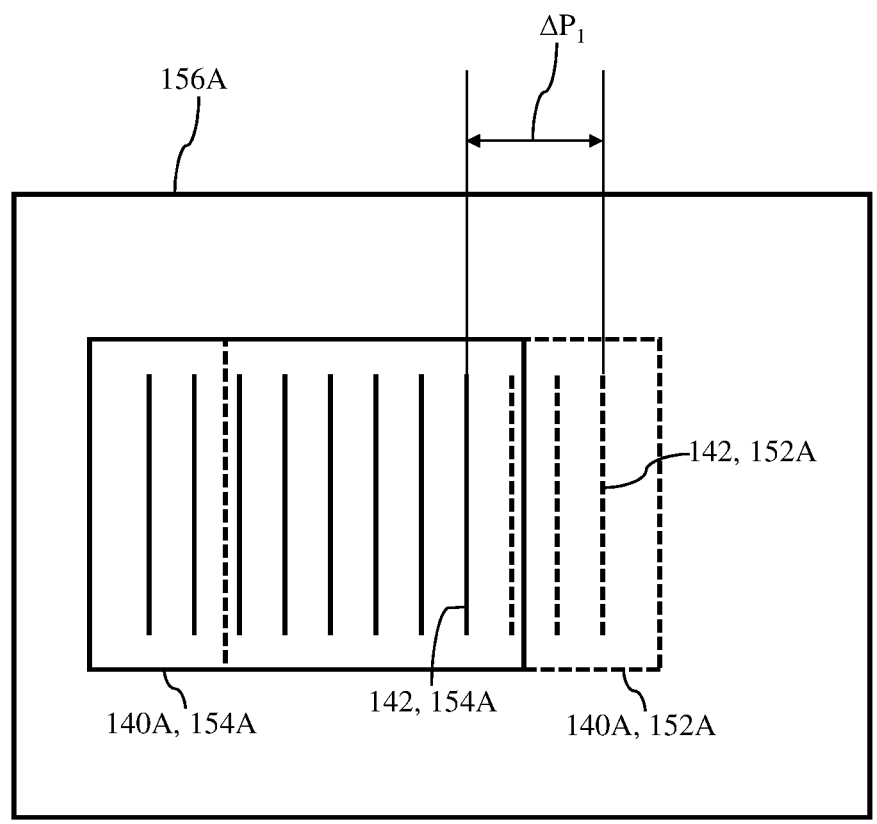
FIG. 11 shows a comparative image of a first predetermined image of a first calibration model captured by a first camera of the calibration system and a predetermined image of the first calibration model, according to embodiments.

FIGS. 9 and 10 show various views of AMS 100 including calibration system having two, distinct calibration models 140A, 140B, and two, distinct cameras 146A, 146B. As shown in FIGS. 9 and 10, first calibration model 140A may be substantially similar or identical to calibration model 140 discussed and shown herein with respect to FIGS. 1 and 2. Additionally, first camera 146A may be substantially similar or identical to camera 146 discussed and shown herein with respect to FIGS. 1 and 2. Redundant explanation of these components has been omitted for clarity.

Calibration system 130 shown in FIGS. 9 and 10 may also include second calibration model 140B and second camera 146B. Second calibration model 140B and second camera 146B may be substantially similar or identical to first calibration model 140A and first camera 146A, respectively, in both component-type and positional relationship within AMS 100. For example, both second calibration model 140B and second camera 146B may be visually aligned with, positioned above and vertically offset from reflective element 136 of calibration system 130. Additionally, second calibration model 140B and second camera 146B may be substantially aligned with each other. Similar to first calibration model 140A, second calibration model 140B may include a plurality of reference lines 142 formed thereon. Furthermore, second camera 146B, like first camera 146A, may include any suitable camera device or system that may be configured to capture a reflective image (see, FIG. 12) of second calibration model 140B.

However, and as shown in FIGS. 9 and 10, second calibration model 140B and second camera 146B may be positionally shifted and/or rotated from first calibration model 140A and first camera 146A, respectively. In the non-limiting example, second calibration model 140B and second camera 146B may be positionally shifted and/or rotated approximately 90 degrees (90°) from first calibration model 140A and first camera 146A within AMS 100. As such, first reflective lines 148A of first calibration model 140A and first camera 146A may be substantially perpendicular to second reflective lines 148B of second calibration model 140B and second camera 146B.

Calibration system 130 of AMS 100 may include two distinct calibration models 140A, 140B and cameras 146A, 146B to aid in calibrating movable build platform 102. Specifically, each corresponding pair of calibration models 140A, 140B and cameras 146A, 146B may be used to determine an actual inclination of movable build platform 102 in a single direction (e.g., $T_{D1}$ or $T_{D2}$). For example, and as shown in comparative image 156A of FIG. 11, first calibration model 140A and first camera 146A may be utilized to determine the actual inclination of movable build platform 102 in the first tilt or inclination direction ($T_{D1}$) by determining the first positional deviation ($\Delta P_1$). As similarly discussed herein with respect to FIGS. 3-5, first positional deviation ($\Delta P_1$) may be determined by measuring a distance between the actual position of at least one reference line 142 of first calibration model 140A in first reflective image 154A captured by first camera 146A, and the same, corresponding reference line(s) 142 depicted in predetermined image 152A of first calibration model 140A.

Figure 12:
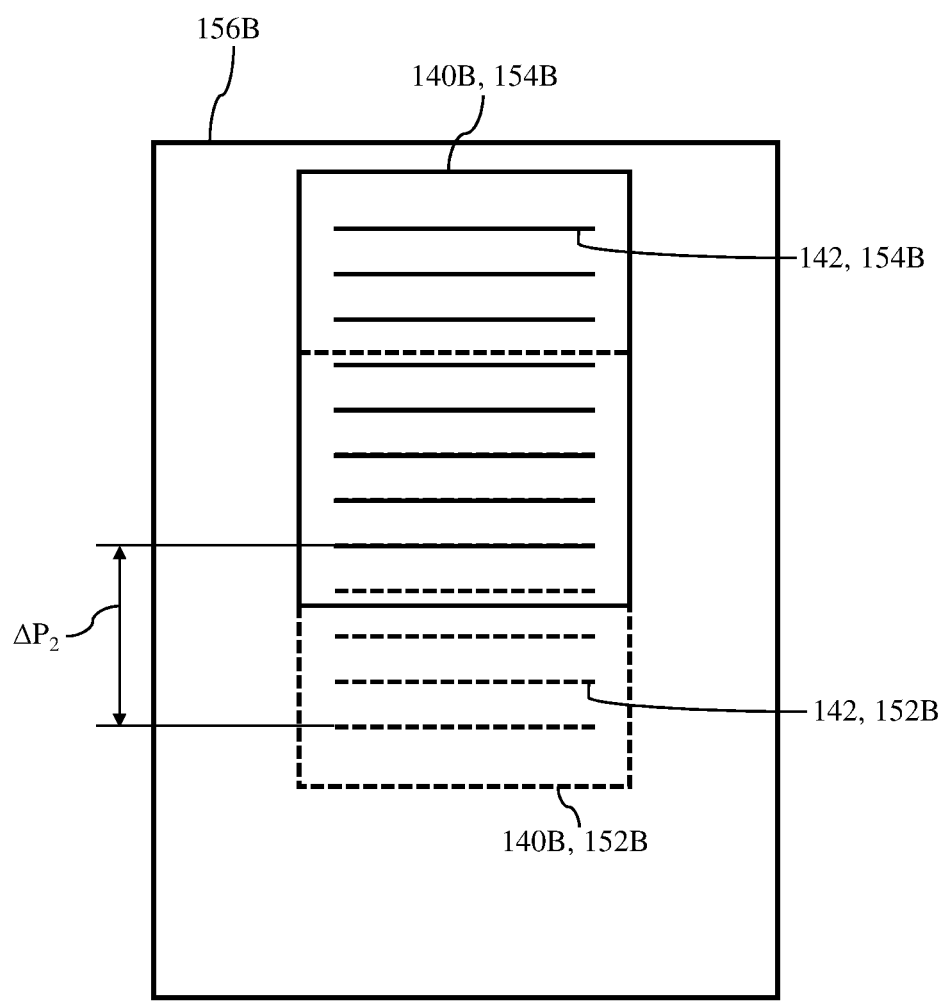
FIG. 12 shows a comparative image of a second predetermined image of a second calibration model captured by a second camera of the calibration system and a predetermined image of the second calibration model, according to embodiments.

Similar to first calibration model 140A and first camera 146A, second calibration model 140B and second camera 146B may be used to determine the actual inclination of movable build platform 102 in the second tilt or inclination direction ($T_{D2}$) by determining the second positional deviation ($\Delta P_2$), shown in FIG. 12. As discussed herein, second positional deviation ($\Delta P_2$) may be determined by measuring a distance between the actual position of at least one reference line 142 of second calibration model 140B in second reflective image 154A captured by second camera 146B, and the same, corresponding reference line(s) 142 depicted in predetermined image 152B of second calibration model 140B. As similarly discussed herein with respect to FIG. 6, determining both positional deviations ($\Delta P_1$, $\Delta P_2$) using the various components of calibration system 130 (e.g., first calibration model 140A, first camera 146A, second calibration model 140B, second camera 146B) may aid in the calibrating movable build platform 102 to desired inclination 150 (see, FIG. 9).

Figure 13:
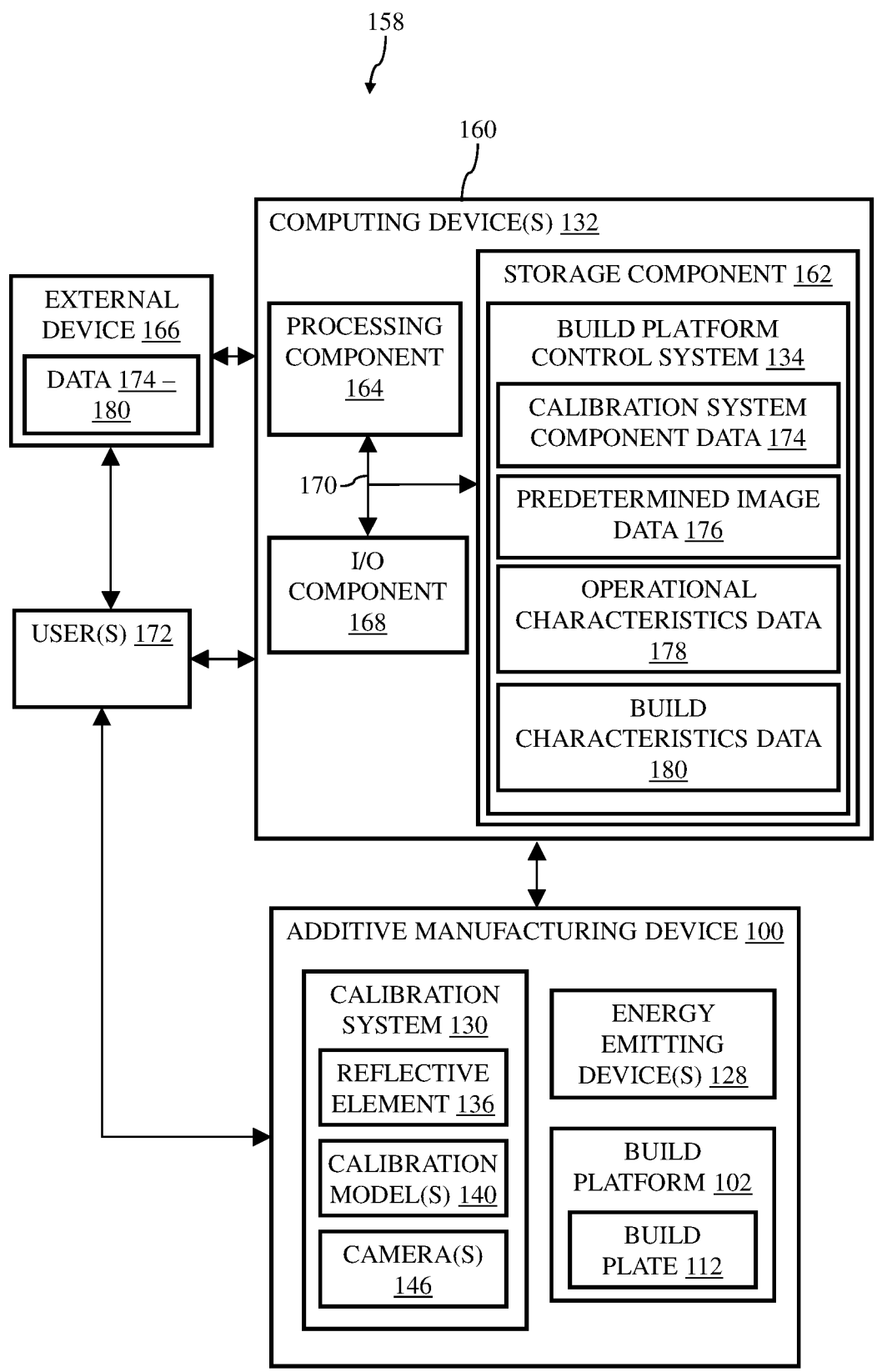
FIG. 13 shows an environment including a calibration system for a movable build platform of the additive manufacturing systems of FIGS. 1, 2 and 7-10, according to embodiments.

FIG. 13 shows an illustrative environment 158. To this extent, environment 158 includes computer infrastructure 160 that can perform the various process steps described herein for calibrating movable build platform 102 of AMS 100 by adjusting the actual inclination of build platform 102 (see, FIG. 1). In particular, computer infrastructure 160 is shown including computing device(s) 132 that comprises movable build platform control system 134 (hereafter, "control system 134"), which enables computing device(s) 132 to calibrate movable build platform 102 of AMS 100 by performing one or more of the process steps of the disclosure.

Computing device(s) 132 is shown including a storage component 162 (e.g., non-transitory computer readable storage medium), a processing component 164, an input/output (I/O) component 158, and a bus 160. Further, computing device(s) 132 is shown in communication with AMS 100, and its various components (e.g., build platform 102, build plate 112, recoater device 120 including blade 124 and so on). As is known, in general, processing component 164 executes computer program code, such as control system 134, that is stored in storage component 162 or an external storage component 166. While executing computer program code, processing component 164 can read and/or write data, such as control system 134, to/from storage component 162 and/or I/O component 168. Bus 170 provides a communications link between each of the components in computing device(s) 132. I/O component 168 can comprise any device that enables a user 172 to interact with computing device(s) 132 or any device that enables computing device(s) 132 to communicate with one or more other computing devices.

Input/output components 168 (including but not limited to keyboards, displays, pointing devices, etc.) can be coupled to the system either directly or through intervening I/O controllers.

In any event, computing device(s) 132 can comprise any general purpose computing article of manufacture capable of executing computer program code installed by a user 172 (e.g., a personal computer, server, handheld device, etc.). However, it is understood that computing device(s) 132 and control system 134 are only representative of various possible equivalent computing devices that may perform the various process steps of the disclosure. To this extent, in other embodiments, computing device(s) 132 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 160 is only illustrative of various types of computer infrastructures for implementing the disclosure. For example, in one embodiment, computer infrastructure 160 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed herein, control system 134 enables computing infrastructure 160 to control operation of AMS 100. To this extent, control system 134 is shown including calibration system component data 174, predetermined image data 176, operational characteristics data 178, and build characteristics data 180. Calibration system component data 174 may include program code related to calibration model 140, camera 146, captured reflective images 152, and processes for determining, measuring and/or detecting inclination of movable build platform 102. Predetermined image data 176 may include program code related to predetermined, desired images 154 of calibration model 140 of calibration system 130, as discussed herein. Operational characteristics data 178 may include program code related to the operation and/or control of AMS 100, and specifically components of AMS 100 including moveable build platform 102, recoater device 120, energy emitting device(s) 128 and the like.

Build characteristics data 180 may include program code related to the component intended to be built by AMS 100, which may include information and/or data specific to the features, geometry and/or layers of the component, as discussed herein. Additionally operation of each of these data 174-180 is discussed further herein. However, it is understood that some of the various data shown in FIG. 13 can be implemented independently, combined, and/or stored in memory for one or more separate computing devices that are included in computer infrastructure 160. Further, it is understood that some of the data and/or functionality may not be implemented, or additional data and/or functionality may be included as part of environment 158. In a non-limiting example, various data 174-180 may be stored on external storage device 162.

As discussed herein, build characteristics data 180 may include program code related to the component intended to be built by AMS 100, which may include information and/or data specific to the features, geometry and/or layers of the component. The program code of build characteristics data 180 may include a precisely defined 3D model of the component and can be generated from any of a large variety of well-known computer aided design (CAD) software systems such as AutoCAD®, TurboCAD®, DesignCAD 3D Max, CATIA®, NX® etc. In this regard, the program code of build characteristics data 180 can take any now known or later developed file format. For example, the program code of build characteristics data 180 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. The program code of build characteristics data 180 may be translated between different formats, converted into a set of data signals and transmitted, received as a set of data signals and converted to code, stored, etc., as necessary. The program code of build characteristics data 180 may be an input to computing device(s) 132 and/or storage component 162, and may come from a part designer, an intellectual property (IP) provider, a design company, user(s) 172 of computing device(s) 132, external storage device 162, or from other sources. As discussed herein, computing device(s) 132 and/or control system 134 executes the program code of build characteristics data 180, and divides the component into a series of defined layers, which may be individually transformed (e.g., sintered, melted) after formation by energy emitting device 128 to form the component.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining calibration system component data 174, obtaining build characteristics data 180 for component, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An additive manufacturing system comprising:
   a build chamber;
   a movable build platform positioned within the build chamber; and
   a calibration system operably connected to the movable build platform, the calibration system including:
      a reflective element operably coupled to the movable build platform;
      a first calibration model positioned above the reflective element and coupled to the build chamber, the first calibration model positioned vertically offset and at least partially misaligned vertically from the reflective element;
      a first camera positioned above the reflective element and substantially aligned with the first calibration model, the first camera visually aligned with the reflective element to capture a first reflective image of the first calibration model as reflected by the reflective element operably coupled to the movable build platform; and
      at least one computing device operably connected to the movable build platform and the first camera, the at least one computing device configured to calibrate the movable build platform by:
         adjusting an actual inclination of the movable build platform in response to determining the first reflective image of the first calibration model differs from a predetermined image of the first calibration model,
         wherein the predetermined image of the first calibration model corresponds to a desired inclination of the movable build platform.

2. The additive manufacturing system of claim 1, wherein the reflective element of the calibration system is one of: positioned directly on the movable build platform, or formed integrally within the movable build platform.

3. The additive manufacturing system of claim 1, further comprising:
   a build plate positioned directly on the movable build platform, the build plate including a build surface configured to receive a powder material for forming a component,
   wherein the reflective element of the calibration system is positioned directly on the build surface of the build plate.

4. The additive manufacturing system of claim 1, wherein the first calibration model of the calibration system includes a plurality of reference lines.

5. The additive manufacturing system of claim 4, wherein the at least one computing device of the calibration system is configured to calibrate the movable build platform by:
   comparing an actual position of the plurality of reference lines of the first calibration model captured in the first reflective image with a desired position of the plurality of reference lines of the predetermined image of the first calibration model; and
   determining a positional deviation of the plurality of reference lines of the first calibration model captured in the first reflective image from the plurality of reference lines of the predetermined image of the first calibration model.

6. The additive manufacturing system of claim 1, wherein the at least one computing device of the calibration system is configured to adjust the actual inclination of the movable build platform by:
   altering the actual inclination of the movable build platform until the actual inclination is identical to the desired inclination of the movable build platform.

7. The additive manufacturing system of claim 1, wherein the calibration system further includes:
   a second calibration model positioned above and vertically offset from the reflective element, the second calibration model positioned substantially proximate to the first calibration model; and
   a second camera positioned substantially above the reflective element and substantially aligned with the second calibration model, the second camera operably connected to the at least one computing device,
   wherein the second camera is visually aligned with the reflective element to capture a second reflective image of the second calibration model using the reflective element operably coupled to the movable build platform.

8. The additive manufacturing system of claim 7, wherein the at least one computing device is configured to calibrate the movable build platform by:
   adjusting the actual inclination of the movable build platform in response to determining the second reflective image of the second calibration model differs from a predetermined image of the second calibration model,
   wherein the predetermined image of the second calibration model corresponds to the desired inclination of the movable build platform.

9. A calibration system operably connected to a movable build platform of an additive manufacturing system, the calibration system comprising:
   a reflective element operably coupled to the movable build platform;
   a first calibration model positioned above and vertically offset from the reflective element, the first calibration model coupled to a build chamber of the additive manufacturing system that substantially surrounds the movable build platform;

a first camera positioned above the reflective element and substantially aligned with the first calibration model, the first camera visually aligned with the reflective element to capture a first reflective image of the first calibration model as reflected by the reflective element operably coupled to the movable build platform; and at least one computing device operably connected to the movable build platform and the first camera, the at least one computing device configured to calibrate the movable build platform by:

adjusting an actual inclination of the movable build platform in response to determining the first reflective image of the first calibration model differs from a predetermined image of the first calibration model, wherein the predetermined image of the first calibration model corresponds to a desired inclination of the movable build platform.

10. The calibration system of claim 9, wherein the reflective element is one of:
positioned directly on the movable build platform,
formed integrally within the movable build platform, or
positioned directly on a build surface of a build plate of the additive manufacturing system, the build plate positioned directly on the movable build platform.

11. The calibration system of claim 9, wherein the first calibration model includes a plurality of reference lines.

12. The calibration system of claim 11, wherein the at least one computing device is configured to calibrate the movable build platform by:
comparing an actual position of the plurality of reference lines of the first calibration model captured in the first reflective image with a desired position of the plurality of reference lines of the predetermined image of the first calibration model; and
determining a positional deviation of the plurality of reference lines of the first calibration model captured in the first reflective image from the plurality of reference lines of the predetermined image of the first calibration model.

13. The calibration system of claim 9, wherein the at least one computing device is configured to adjust the actual inclination of the movable build platform by:
altering the actual inclination of the movable build platform until the actual inclination is identical to the desired inclination of the movable build platform.

14. The calibration system of claim 9, further comprising:
a second calibration model positioned above and vertically offset from the reflective element, the second calibration model positioned substantially proximate to the first calibration model; and
a second camera positioned substantially above the reflective element and substantially aligned with the second calibration model, the second camera operably connected to the at least one computing device,
wherein the second camera is visually aligned with the reflective element to capture a second reflective image of the second calibration model using the reflective element operably coupled to the movable build platform.

15. The calibration system of claim 14, wherein the at least one computing device is configured to calibrate the movable build platform by:
adjusting the actual inclination of the movable build platform in response to determining the second reflective image of the second calibration model differs from a predetermined image of the second calibration model, wherein the predetermined image of the second calibration model corresponds to the desired inclination of the movable build platform.

16. A computer program product comprising program code stored on a non-transitory computer readable storage medium, which when executed by at least one computing device, causes the at least one computing device to calibrate a movable build platform of an additive manufacturing system by performing processes including:
adjusting an actual inclination of the movable build platform in response to determining a first reflective image of a first calibration model differs from a predetermined image of the first calibration model, the predetermined image of the first calibration model corresponds to a desired inclination of the movable build platform,
wherein a first camera visually aligned with a reflective element positioned on the movable build platform is configured to capture the first reflective image of the first calibration model as reflected by the reflective element, and
wherein the first calibration model is coupled to a build chamber of the additive manufacturing system that substantially surrounds the movable build platform.

17. The computer program product of claim 16, wherein adjusting the actual inclination of the movable build platform includes:
altering the actual inclination of the movable build platform until the actual inclination is identical to the desired inclination of the movable build platform.

18. The computer program product of claim 16, wherein the first calibration model includes a plurality of reference lines.

19. The computer program product of claim 18, wherein the program code causes the at least one computing device to:
comparing an actual position of the plurality of reference lines of the first calibration model captured in the first reflective image with a desired position of the plurality of reference lines of the predetermined image of the first calibration model; and
determining a positional deviation of the plurality of reference lines of the first calibration model captured in the first reflective image from the plurality of reference lines of the predetermined image of the first calibration model.

20. The computer program product of claim 16, wherein the reflective element is one of:
positioned directly on the movable build platform,
formed integrally within the movable build platform, or
positioned directly on a build surface of a build plate of the additive manufacturing system, the build plate positioned directly on the movable build platform.

* * * * *